US012749090B2

(12) United States Patent
Demsey

(10) Patent No.: US 12,749,090 B2
(45) Date of Patent: Sep. 29, 2026

(54) SYSTEMS AND METHODS FOR ONLINE TRAFFIC FILTRATION BY ELECTRONIC CONTENT PROVIDERS

(71) Applicant: Yahoo Ad Tech LLC, New York, NY (US)

(72) Inventor: Seth Mitchell Demsey, Dulles, VA (US)

(73) Assignee: Yahoo Ad Tech LLC, New York, NY (US)

( * ) Notice: Subject to any disclaimer, the term of this patent is extended or adjusted under 35 U.S.C. 154(b) by 7 days.

(21) Appl. No.: 18/779,674

(22) Filed: Jul. 22, 2024

(65) Prior Publication Data

US 2024/0378635 A1 Nov. 14, 2024

Related U.S. Application Data

(63) Continuation of application No. 17/663,787, filed on May 17, 2022, now Pat. No. 12,045,852, which is a (Continued)

(51) Int. Cl.

*G06Q 30/00* (2023.01)
*G06Q 30/0241* (2023.01)
*G06Q 30/0242* (2023.01)

(52) U.S. Cl.

CPC ..... *G06Q 30/0244* (2013.01); *G06Q 30/0277* (2013.01)

(58) Field of Classification Search

None

See application file for complete search history.

(56) References Cited

U.S. PATENT DOCUMENTS 5,724,424 A * 3/1998 Gifford .................. G06Q 30/02 380/30
5,855,008 A * 12/1998 Goldhaber ......... G06Q 30/0247 705/14.1

(Continued)

FOREIGN PATENT DOCUMENTS

EP 1253539 A2 * 10/2002 ............. G06Q 30/02
JP 2009015593 A * 1/2009 ............. G06Q 30/00
JP 2012108916 A * 6/2012 ............. G06Q 30/02

OTHER PUBLICATIONS

Brett Stone-Gross et al. Understanding Fraudulent Activities in Online Ad Exchanges. (Nov. 2, 2011). http://conferences.sigcomm.org/imc/2011/docs/p279.pdf. Retrieved online Jan. 12, 2019. (Year: 2011).*

(Continued)

*Primary Examiner* — James A Reagan

(74) *Attorney, Agent, or Firm* — Bookoff McAndrews, PLLC

(57) ABSTRACT

Systems and methods are disclosed for traffic filtration by content providers. One method includes receiving a content request from a device of a user; determining whether one or more container tags are associated with requested content; determining, prior to responding to the content request, whether the content request is by a user based on the content request and the one or more container tags; generating, prior to responding to the content request, an ad request based on the content request and the one or more container tags; determining, prior to responding to the content request, an ad request recipient based on the generated ad request and the one or more container tags; transmitting the ad request to the determined ad request recipient; and transmitting, over the electronic network to the device, a response to the content request when the content request is determined to be by a user.

20 Claims, 3 Drawing Sheets

Related U.S. Application Data continuation of application No. 16/384,471, filed on Apr. 15, 2019, now Pat. No. 11,361,341, which is a continuation of application No. 14/867,802, filed on Sep. 28, 2015, now Pat. No. 10,296,938.

(56) References Cited

U.S. PATENT DOCUMENTS

| | | | | | |
|---|---|---|---|---|---|
| 5,918,014 | A * | 6/1999 | Robinson | H04N 21/2743 | 709/219 |
| 6,009,409 | A * | 12/1999 | Adler | G06Q 30/0264 | 705/14.61 |
| 6,285,987 | B1 * | 9/2001 | Roth | G06Q 30/0277 | 705/37 |
| 6,286,005 | B1 * | 9/2001 | Cannon | H04N 21/812 | 455/2.01 |
| 6,324,519 | B1 * | 11/2001 | Eldering | G06Q 30/0275 | 705/37 |
| 6,338,053 | B2 * | 1/2002 | Uehara | G06F 16/284 | 705/28 |
| 8,296,179 | B1 * | 10/2012 | Rennison | G06Q 30/0251 | 705/14.53 |
| 8,463,658 | B2 * | 6/2013 | Racco | G06Q 30/0601 | 705/26.1 |
| 9,779,412 | B2 * | 10/2017 | McElfresh | G06Q 30/0254 | |
| 10,296,938 | B1 * | 5/2019 | Demsey | G06Q 30/0244 | |
| 10,448,268 | B1 * | 10/2019 | Jaya | H04L 12/14 | |
| 2001/0042006 | A1 * | 11/2001 | Chan | G06Q 30/0251 | 705/14.49 |
| 2002/0048369 | A1 * | 4/2002 | Ginter | G06F 21/572 | 380/246 |
| 2002/0104083 | A1 * | 8/2002 | Hendricks | H04N 21/262 | 348/E5.103 |
| 2002/0133399 | A1 * | 9/2002 | Main | G06Q 30/0247 | 705/14.69 |
| 2004/0006606 | A1 * | 1/2004 | Marotta | G06Q 30/0277 | 709/219 |
| 2004/0103024 | A1 * | 5/2004 | Patel | G06Q 30/0247 | 705/14.53 |
| 2005/0065811 | A1 * | 3/2005 | Chu | G06Q 30/0601 | 705/347 |
| 2005/0182676 | A1 * | 8/2005 | Chan | G06Q 30/0243 | 705/14.42 |
| 2006/0069613 | A1 * | 3/2006 | Marquardt | G06Q 30/02 | 705/14.47 |
| 2006/0080171 | A1 * | 4/2006 | Jardins | G06Q 30/0272 | 705/28 |
| 2006/0212350 | A1 * | 9/2006 | Ellis | G06Q 30/0275 | 705/14.66 |
| 2006/0212898 | A1 * | 9/2006 | Steelberg | H04N 21/25891 | 725/32 |
| 2006/0253584 | A1 * | 11/2006 | Dixon | G06Q 30/02 | 709/225 |
| 2007/0156621 | A1 * | 7/2007 | Wright | G06Q 30/02 | 706/48 |
| 2007/0214045 | A1 * | 9/2007 | Subramanian | G06Q 30/02 | 705/80 |
| 2008/0091796 | A1 * | 4/2008 | Story | H04L 67/306 | 709/217 |
| 2008/0262917 | A1 * | 10/2008 | Green | G06Q 30/02 | 705/14.71 |
| 2009/0254572 | A1 * | 10/2009 | Redlich | G06Q 10/06 | |
| 2010/0082433 | A1 * | 4/2010 | Zhou | G06Q 30/08 | 705/14.54 |
| 2010/0145809 | A1 * | 6/2010 | Knapp | G06Q 30/08 | 705/14.71 |
| 2010/0241507 | A1 * | 9/2010 | Quinn | G06Q 30/0244 | 705/14.42 |
| 2011/0231242 | A1 * | 9/2011 | Dilling | G06Q 30/0243 | 705/14.42 |
| 2011/0231264 | A1 * | 9/2011 | Dilling | G06Q 30/0275 | 705/14.71 |
| 2012/0158490 | A1 * | 6/2012 | Neumeyer | G06Q 30/0247 | 705/14.46 |
| 2012/0310729 | A1 * | 12/2012 | Dalto | G06Q 30/02 | 705/14.43 |
| 2013/0160120 | A1 * | 6/2013 | Malaviya | G06Q 30/0244 | 726/23 |
| 2014/0297617 | A1 * | 10/2014 | Rajakarunanayake | G06F 17/30241 | 707/709 |
| 2015/0339734 | A1 * | 11/2015 | Wilson | G06Q 30/00 | 705/14.73 |
| 2017/0124596 | A1 * | 5/2017 | Wang | G06Q 30/0269 | |

OTHER PUBLICATIONS

Scott, Samuel. The Alleged $7.5 Billion Fraud in Online Advertising. (Jun. 22, 2015). Retrieved online Dec. 31, 2020. https://moz.com/blog/online-advertising-fraud (Year: 2015).*

Alexey Reznichenko. “Private-By-Design Advertising and Analytics: From Theory To Practice.” (Jun. 16, 2014) . Retrieved online Jan. 12, 2022. https://www.mpi-sws.org/tr/2014-005.pdf(Year: 2014).*

* cited by examiner

SYSTEMS AND METHODS FOR ONLINE TRAFFIC FILTRATION BY ELECTRONIC CONTENT PROVIDERS

CROSS-REFERENCE TO RELATED APPLICATION(S)

This patent application is a continuation of and claims the benefit of priority to U.S. application Ser. No. 17/663,787, filed on May 17, 2022, which is a continuation of and claims the benefit of priority to U.S. application Ser. No. 16/384,471, filed on Apr. 15, 2019, now U.S. Pat. No. 11,361,341, which is a continuation of and claims the benefit of priority to U.S. application Ser. No. 14/867,802, filed Sep. 28, 2015, now U.S. Pat. No. 10,296,938, the entireties of which are incorporated herein by reference.

TECHNICAL FIELD

The present disclosure relates to filtration of online traffic prior to the delivery of electronic content and advertisements to an electronic content requestor in communication networks.

BACKGROUND

Internet advertising based on pay-per-impression often involves charging an advertiser for the exposure of its advertisements to users regardless if the advertisement resulted in the user actually visiting the advertiser's site by clicking on the advertisement. For example, an advertiser may pay an entity operating an advertising server or a publisher website to display the advertiser's advertisement for a certain number of times that the advertisement is displayed. While this method of advertising offers a potentially high exposure rate to numerous users, such simplistic exposure to such a large number of users offers little in the form of users generally interested in the advertisement, which would prompt the user to visit the advertiser's Internet site to purchase the advertised product or service. For example, out of 10,000 users that the advertisement was displayed to, if only 10 went to the advertiser's website to view the advertiser's products or services, the advertiser must still pay for the 10,000 advertisement displays, i.e., "impressions."

Thus, it is desirable for the advertiser to use advertising servers and/or publisher servers that reduce the amount of fraudulent traffic and untargeted users in order to provide an advertisement to as many potential customers as possible.

SUMMARY OF THE DISCLOSURE

Embodiments of the present disclosure include systems and methods for online traffic filtration by electronic content providers.

According to certain embodiments, computer-implemented methods are disclosed for online traffic filtration by electronic content providers. One method includes receiving, over an electronic network, at a content provider, an electronic content request from a device of a user; determining, by at least one processor, whether one or more container tags for filtration or enrichment are associated with requested content of the content request by the user device; determining, by the at least one processor, prior to responding to the content request, whether the content request is by a user based on the content request and the one or more container tags; generating, by the at least one processor, prior to responding to the content request, an ad request based on the content request and the one or more container tags when the content request is determined to be by the user; determining, by the at least one processor, prior to responding to the content request, an ad request recipient based on the generated ad request and the one or more container tags; transmitting, over the electronic network, the ad request to the determined ad request recipient when the content request is determined to be by a user; and transmitting, over the electronic network to the device of the user, a response to the content request when the content request is determined to be by a user.

According to certain embodiments, systems are disclosed for online traffic filtration by electronic content providers. One system includes a data storage device that stores instructions for online traffic filtration by electronic content providers; and a processor configured to execute the instructions to perform a method including: receiving, over an electronic network, at an electronic content provider, a content request from a device of a user; determining whether one or more container tags for filtration or enrichment are associated with requested content of the content request by the user device; determining, prior to responding to the content request, whether the content request is by a user based on the content request and the one or more container tags; generating, prior to responding to the content request, an ad request based on the content request and the one or more container tags when the content request is determined to be by the user; determining, prior to responding to the content request, an ad request recipient based on the generated ad request and the one or more container tags; transmitting, over the electronic network, the ad request to the determined ad request recipient when the content request is determined to be by a user; and transmitting, over the electronic network to the device of the user, a response to the content request when the content request is determined to be by a user.

According to certain embodiments, a non-transitory computer readable medium is disclosed that stores instructions that, when executed by a computer, cause the computer to perform a method for online traffic filtration by electronic content providers. One method includes receiving, over an electronic network, at an electronic content provider, a content request from a device of a user; determining, by at least one processor, whether one or more container tags for filtration or enrichment are associated with requested content of the content request by the user device; determining, by the at least one processor, prior to responding to the content request, whether the content request is by a user based on the content request and the one or more container tags; generating, by the at least one processor, prior to responding to the content request, an ad request based on the content request and the one or more container tags when the content request is determined to be by the user; determining, by the at least one processor, prior to responding to the content request, an ad request recipient based on the generated ad request and the one or more container tags; transmitting, over the electronic network, the ad request to the determined ad request recipient when the content request is determined to be by a user; and transmitting, over the electronic network to the device of the user, a response to the content request when the content request is determined to be by a user.

Additional objects and advantages of the disclosed embodiments will be set forth in part in the description that follows, and in part will be apparent from the description, or may be learned by practice of the disclosed embodiments.

The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Specific embodiments of the present disclosure will now be described with reference to the drawings. As will be recognized, the present disclosure is not limited to these particular embodiments. For instance, although described in the context of advertisements displayed on web pages of websites, the present disclosure may also be used in other types of interactive systems that support the display of selectable advertisements, such as interactive television systems.

The present disclosure relates to systems and methods that provide on page filtration of traffic prior to having a response to content requests and transmitting ad requests to consumers, ad servers, and/or ad exchanges. Ad requests may be transmitted to ad servers and/or ad exchanges after a publisher server and/or a content distribution network performs certain processing based on container tags contained within the content requested by a content requestor.

The container tags may allow publisher and/or content distribution networks to transmit ad requests to their own preferred ad servers and/or ad exchange. Further, since ad requests may be fraudulent requests and may be used to drive up the cost to advertisers, the container tags may also allow publisher servers and/or CDNs to filter out bad content request and/or ad requests. Also, container tags may be used to filter users who are using ad blockers.

The container tags may also allow publisher servers and/or CDNs to filter out bad content request and/or ad request based on determining whether a user is making a legitimate request for content and/or advertisements. Further, the container tags may allow publisher servers and/or CDNs to enrich content requests and ad requests by adding user data about the requestor, which may be used to target content and/or ads to the requestor.

Figure 1:
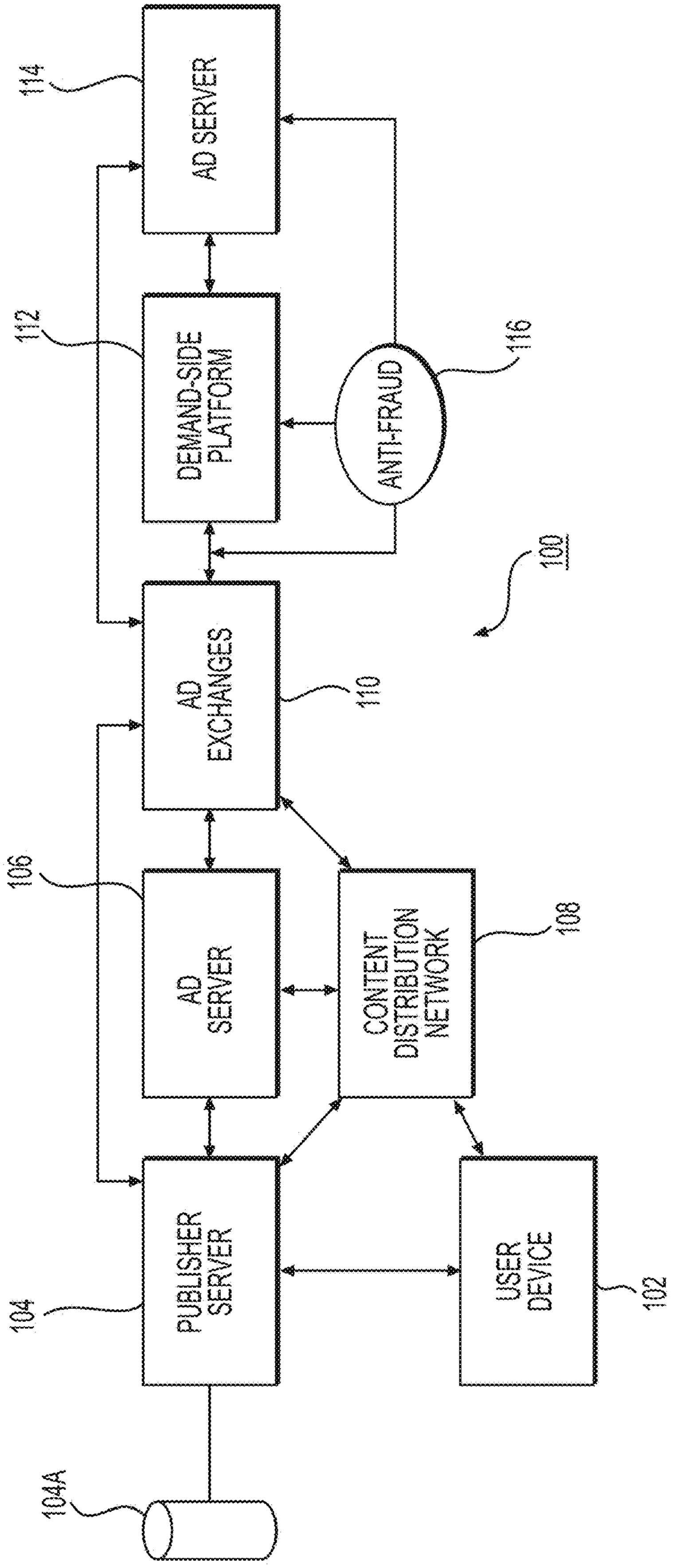
FIG. 1 depicts a schematic diagram of a network environment for traffic filtration by content providers, according to an exemplary embodiment of the present disclosure.

FIG. 1 depicts an exemplary environment 100 for traffic filtration by content providers, according to embodiments of the present disclosure. As shown in FIG. 1, the environment 100 includes a user device 102, a publisher server 104, an ad server 106, a content distribution network ("CDN") 108, an ad exchange 110, a demand-side platform 112, and a second ad server 114. A web site may be provided by the publisher server 104 to the user device 102. The publisher server 104 and/or CDN 108 may determine an ad server and/or an ad exchange, such as ad server 106 and/or ad exchange 110, to provide an ad included in the web site provided to user device 102.

The ad server 106 may provide ads directly to publisher server 104 and indirectly to publisher server 104 through the ad exchange 110. Each of publisher server 104, ad server 106, CDN 108, ad exchange 110, demand-side platform 112, and second ad server 114 may serve ads directly and/or indirectly to the user device 102. In the embodiment depicted in FIG. 1, the publisher server 104 may retrieve one or more ads from the ad server 104 and/or the ad exchange 110 in response to a page request from user device 102, and the publisher server 104 may include the one or more ads into the requested web pages. In an alternative embodiment, the publisher server 104 may instruct the content distribution network 108 to retrieve one or more ads from the ad server 104 and/or the ad exchange 110 in response to a page request from user device 102, and the CDN 108 may include the one or more ads into the requested web pages.

Each of ad server 106 and second ad server 114 may advertise on one or more publisher server 104 websites via the ad exchange 110. As is known in the art, an advertiser may create one or more ads and may specify one or more criteria for controlling how these ads are selected for display to user device 102. For example, the advertiser may associate a given ad with one or more keywords that are used by the ad servers 106 and 114 to select ads for display. Each such ad typically includes a link that can be clicked on to access a corresponding advertiser site.

The publisher server 104, the ad server 106, the content distribution network 108, the ad exchange 110, the demand-side platform 112, and the second ad server 114 may each be implemented by one or more physical servers. The user device 102 may be any type of computing device (PC, Personal Digital Assistant, television set-top box, mobile phone, etc.) capable of retrieving and displaying web pages or other types of HTTP content. The various communications shown in FIG. 1 may occur over the Internet and/or any other type of computer network. Additionally, ad server 106, ad exchange 110, demand-side platform 112, and/or ad server 114 may incorporate their own anti-fraud filters 116 to ensure legitimate ad request from user devices 102. The anti-fraud filters 116 may be used to automatically filter transactions that may be deemed suspicious based on IP-addresses, time zone, and/or language inconsistency. Additionally, anti-fraud filters 116 may provide protection through black lists, white lists, and other fraud protect, as known by persons of ordinary skill in the art.

As depicted in FIG. 1, the publisher server 104 may access a database 104*a* of user data, including user account data, for purposes of determining whether to transmit an ad request to ad server 106 and/or ad exchange 110. For example, publisher server 104 may recognize a user of user device 102 from a web page request, and may append user data related to the user of user device 102 to an ad request sent to ad server 106 and/or ad exchange 110. The user data accessed from the database 104*a* may be used to select an ad by the ad server 106 and/or ad exchange 110 for display on the user device 102.

The user data stored in the database 104*a* may be collected as the result of online and/or offline activity of the user of user device 102. For example, the publisher 104 may operate one or more web sites for providing services (news, sales, rentals, subscription-based content, etc.) to users, or for conducting other types of operations that involve the collection of user data. The types of user data may be collected and stored by the publisher server 104, and may be used to determine which advertisers to send the ad request to. For example, in the context of online sales and rentals of items, the user data stored for a given user may include a username and password, an email address, a shipping address, and/or a history of transactions conducted.

The determination of which advertiser to request ads from, i.e., ad server 106 and ad exchange 110, may be based on user data stored in a database 104*a* of publisher server 104. For example, a publisher server's 104 web site may collect user data in the course of providing services (e.g., sales, rentals, subscriptions, etc.) to its customers. The user data may be used alone, or in combination with other user data received in a web page request by the user of user device 102.

In embodiments in which user data maintained by the publisher server 104 is used to determine which advertiser to send an ad request to, a web site of the publisher server 104 may be configured to transmit a cookie to the user device 102 that accesses the web site. When the user device 102 transmits a request for content to the publisher server 102 with a valid cookie, the user device 102 may be recognized by the publisher server 104. In some cases, a recognized user may be "unknown," meaning generally that the cookie is valid but is not associated with user data stored in database 104*a*. The users may additionally and/or alternatively be recognized via other types of automatically-transmitted identifiers, including unique browser identifiers and unique CPU identifiers.

The following examples illustrate some of the ways the present disclosure may be implemented. As an example, a publisher server 104 may host a website, such as a news content web site. Users may wish to access news articles on this news website, and users may set up a user account with a username and password, along with other user related information. The user account data may be stored in a database 104*a* connected to the publisher server 104. Alternatively, a content distribution network 108 may provide the news website of publisher server 104, and may access the user account data stored in another database and/or in the database 104*a*.

In this example, the publisher server 104 and/or CDN 108 may offer advertisers, such as a demand-side platform 112, through an ad server 106 and/or an ad exchange, ad placements in which their ads are contextually displayed on the story pages of the news website on a pay-per-click basis. The publisher server 104 and/or the CDN 108 may charge the advertisers when a user device is recognized as being a legitimate user. The news web site may be configured with container tags that may be used to determine, and notify the ad server 106 and/or ad exchange 110, whether a user device 102 to which an ad is being served is associated with a legitimate user. Additionally, through use of container tags, user enrichment data may be provided to the ad server 106 and/or ad exchange 110. The user enrichment data may be used to provide targeted advertisements from the ad server 106 and/or ad exchange 110.

Figure 2:
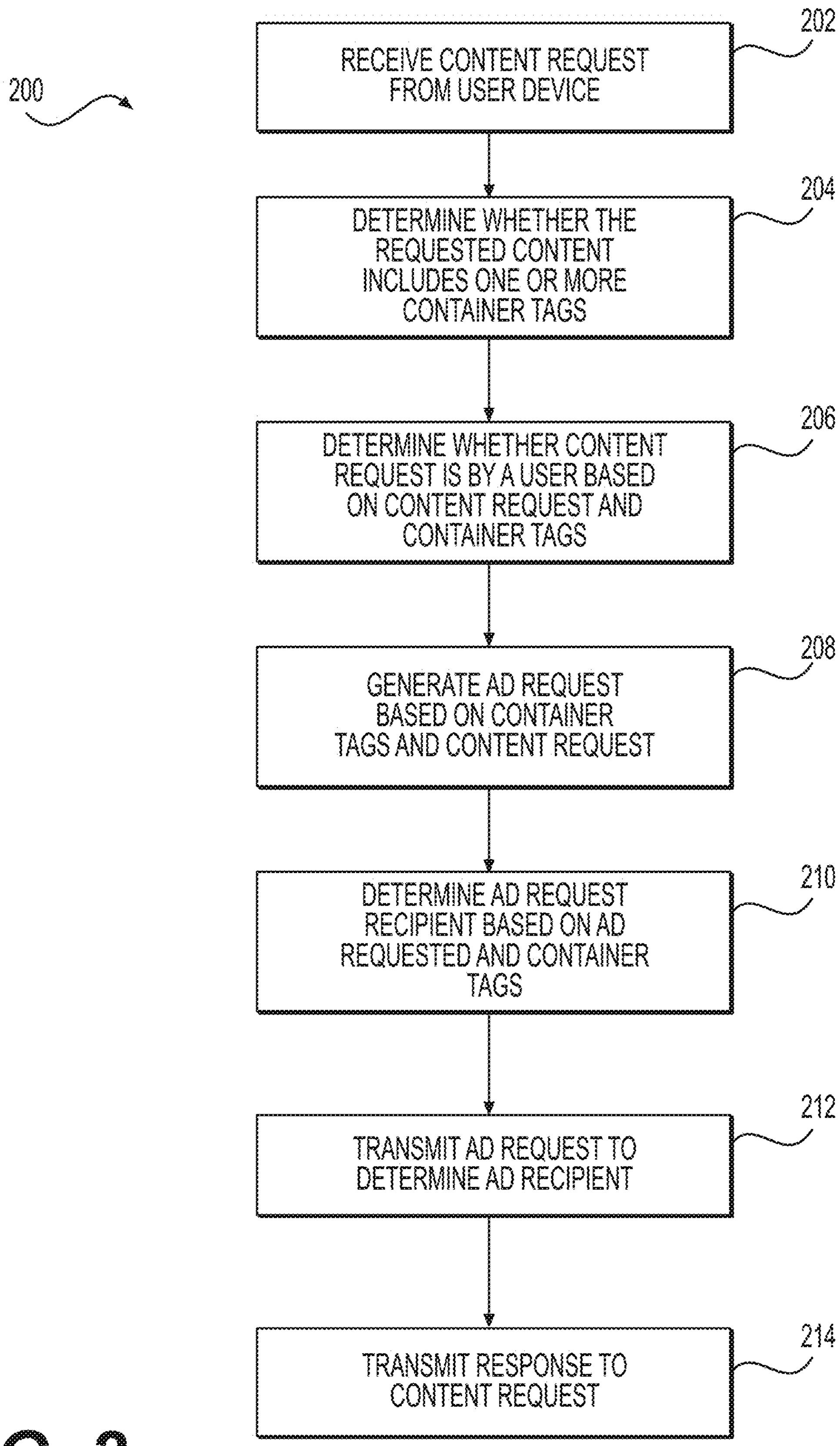
FIG. 2 depicts a flow diagram of an exemplary method for traffic filtration by content providers, according to an exemplary embodiment of the present disclosure.

FIG. 2 depicts an exemplary method 200 of filtering traffic by content providers, according to embodiments of the present disclosure. Although the steps shown in FIG. 2 are numbered sequentially for purposes of explanation, as will be apparent, the steps do not necessarily need to be performed in the listed order.

As shown in FIG. 2, a publisher server, such as publisher server 104, at step 202 may receive, over an electronic network, a content request from a device, such as user device 102. The content request may be a request for a web page by a browser executing on the user device. The web browser executing on the user device may, for example, transmit a page request to the publisher server. The page request may, for example, be an HTTP GET URL request, or may be an HTTP. POST request used to submit a search query or other information supplied by the user. If a cookie corresponding to the publisher's web site is stored on the user device, the cookie may be transmitted with the content request.

The content requested by the user device may be accessed by the publisher server and/or by a content distribution network for transmission to the user device. Upon receiving the content request, the publisher server and/or content distribution network may perform certain tasks depending on tags stored in association with the requested content. For example, container tags stored in association with the requested content on the publisher server and/or content distribution network may include filtration tags and/or user data enrichment tags.

Filtration tags may include tags that determine whether the content request is fraudulent. Filtration tags may also include tags that determine which one or more ad servers and/or ad exchanges are to receive ad requests associated with the content request. User data enrichment tags may include tags that determine which user data to provide with an ad request associated with the requested content.

At step 204, the publisher server 104 and/or CDN 108 may determine whether the requested content includes one or more container tags based on the requested content of the content request by the user device. The publisher server 104 and/or CDN 108, based on the content request, may inspect the requested content to determine whether any container tags are contained within the requested content. For example, the container tags may be Hypertext Transfer Protocol ("HTTP") header fields, which are components of a header section of a content request and a response to a content request. The HTTP header fields may define the operating parameters of an HTTP transaction, such as filtration of fraudulent requests and user data enrichment.

At step 206, the publisher server and/or CDN, prior to responding to the content request, may determine whether the content request is by a user based on the content request and the container tag associated with the requested content. The determination of whether the content request is by a user may be made based on the content request from the user device and/or by determining if the content request is accompanied by a cookie. For example, the publisher server and/or CDN may determine whether the content request is associated with a user or a user account stored in a database based on the cookie received with the content request. The publisher server may use the received cookie to look up associated user data from the data base.

When the content request is determined to be by a user, the publisher server and/or CDN at step 208 may generate an ad request based on the content request and the one or more container tags. For example, the ad request may include a number of ads to be displayed with the requested content. The ad request may include additional data. For example, if the one or more container tags include user data enrichment tags, then user data related to the user device that transmitted the content request may be added to the ad request.

At step 210, the publisher server and/or CDN may determine an ad request recipient based on the generated ad request and the one or more container tags. For example, if the ad request includes a request for more than one ad, the publisher server and/or CDN may transmit the ad request to an ad server and/or an ad exchange to provide the more the one ads. Additionally, the one or more container tags may include instructions that one or more predetermined ad servers and/or ad exchanges should receive the ad request.

Then at step 212, the publisher server and/or CDN may transmit, over an electronic network, the ad request to the determined ad request recipient when the content request is determined to be by a user. Then, at step 214, the publisher server and/or CDN may transmit, over the electronic network to the device of the user, a response to the content request when the content request is determined to be by a user.

Referring back to FIG. 1, the publisher server 104 and/or CDN 108 may transmit the ad request to the ad server and/or ad exchange for one or more ads to be displayed in relation to the content request in the content request. The ad request may be accompanied with user data based on the one or more container tags, such as a user data enrichment tag. For example, the publisher server 104 and/or CDN 108 may transmit to the ad server 106 and/or ad exchange 110 user data related to the user that transmitted the content request.

The ad request may also include information about the content request received from the user device 102, such as the URL of a requested web page, or if applicable, a search string supplied by the user. This information may be used by the ad server 106 and/or ad exchange 108 to select one or more appropriate ads to transmit to the user device. The ad request may also include a unique transaction ID that can be used by publisher server 104 and/or CDN 108 for tracking purposes.

The ad server 106 and/or ad exchange 108 may also select one or more ads based on the ad request, and may transmit the selected ads to the publisher server 104 and/or CDN 108 for incorporation into the requested content, such as a web page.

In selecting the ad or ads to be displayed, the ad server 106 and/or ad exchange 110 may optionally take into consideration the user data, requested content, and/or other information. For example, if the user was not recognized by the publisher server 104 and/or CDN 108, the ad server 106 and/or the ad exchange 110 may, in some embodiments, only select ads for which the advertiser does not specify a targeted audience.

The ad server 106 and/or ad exchange 110 may, at the time of returning the ad, determine and record an amount that will be charged to the advertiser if the user subsequently clicks on the ad. Alternatively, this determination may be made at a later point in time, such as after the user clicks on the ad.

The ad or ads selected and returned may also depend upon the content request information, if passed to the ad server 106 and/or ad exchange 110. For example, if the content request is in the form of a search query submission, the ad server and/or ad exchange may select one or more ads associated with any keywords included in the search query. If the content request is a request for a web page of the publisher server 104 and/or CDN 108, the ad or ads may be selected based on the content of the web page.

The publisher server 104 and/or CDN 108 may incorporate the one or more ads into the requested content, and may return the requested content to the user device 102 for display. For purposes of illustration, it is assumed in this example that only a single ad is included in a web page.

The user may select an ad, such as by clicking on a link included in the ad, and may cause the web browser/user device to send a request to an ad server, such as ad server 106 and/or ad server 114. This request may include an identifier of the advertisement, which may be used to look up the corresponding target URL of an advertiser web site. The target URL may alternatively be included in the request message itself. If the user device 102 has previously accessed a web site of the publisher server 104 and/or CDN 108, the request transmitted may also include a cookie associated with this web site.

The ad server 106 and/or ad server 114 may log the request (including any cookie received with the request), and respond by redirecting the user's web browser to an advertiser site. Then, the browser on the user device 102 may respond to the redirect command by retrieving a web page from the advertiser site. In other embodiments, the ad may point directly to the advertiser site such that a redirect is not necessary; in such embodiments, the web page may, for example, include JavaScript code that causes the browser to notify an ad server and/or a publisher server of the ad selection event.

Next, which may alternately occur before the web browser on the user device 102 is redirected to the advertiser site, the ad server 106, publisher server 104, and/or CDN 108 may record the transaction, such as a charge (if any) to the advertiser for the ad selection. As mentioned above, the determination of whether/how much the advertiser will be charged for the ad selection may be made either before or after the ad selection occurs.

The charge to the advertiser may be recorded for a payment to the corresponding publisher server 104 and/or CDN 108, for qualifying advertisements. Although the above-described steps may be performed by a publisher server, the determination may be made by a separate system using information collected by the publisher server, ad server, and/or CDN.

The process depicted in FIG. 2 may be implemented in a number of different ways to so as to inhibit click fraud. For example, in one embodiment, the advertisers may be charged for ad selections made by users who are recognized by the publisher server 104, CDN 108, and/or the ad server 106. Because users that engage in click fraud are generally less likely to be recognized (e.g., because they commonly disable cookies when engaging in click fraud), advertisers may be less likely to be charged for fraudulent ad selection.

To further reduce click fraud, the process of FIG. 2 may be implemented such that the advertiser is charged only if the stored user data (if any) associated with the cookie satisfies one or more selected criteria. For example, the advertiser may be charged only if user data stored by the publisher server 104, CDN 108, and/or the ad servers 106/114 satisfies one or more of the predetermined conditions, such as the user has supplied an email address or telephone number that has been verified. The foregoing is merely an example of the types of criteria that may be applied; other criteria that may be used will be apparent to those skilled in the art.

If multiple different types of user data are taken into consideration, an identity score may be generated to quantify the degree to which the user is known or trusted. The identity score may be generated based on user data maintained by the publisher server 104 and/or CDN 108. Once generated, the identity score for a user device may be used to determine fraudulent web traffic for the user device and/or other user devices.

Even if the user device 102 satisfies the criteria for charging an advertiser, a charge to the advertiser may be blocked by the publisher server 104, CDN 108, and/or ad servers 106, 114 based on a container tag if the user data indicates certain conduct. For example, the charge to the advertiser may be blocked if the user data indicates that the user has clicked on ads of this advertiser more than a threshold number of times (e.g., ten) within a selected time period (e.g., one hour); and/or (2) the user data indicates that the user has clicked on ads displayed on pages of the publisher server more than a threshold number of times during the selected time period.

For example, the publisher server 104, CDN 108, and/or ad servers 106, 114 may track of a number of times each user clicks on an ad of a particular advertiser, and/or a number of times each recognized user clicks on an ad provided by publisher server 104 and/or CDN 108. As another example, the advertiser may not be charged if the user has clicked on any ad of this advertiser in the preceding twenty-four hours.

Further, based on the container tags, user data may be relied on by the publisher server 104 and/or CDN 108 to prevent fraudulent ad requests transmitted to the ad server and/or ad exchange. For example, the publisher server 104 and/or CDN 108 may prevent the transmission of content to the user device 102 based on a determination that the request is fraudulent.

Figure 3:
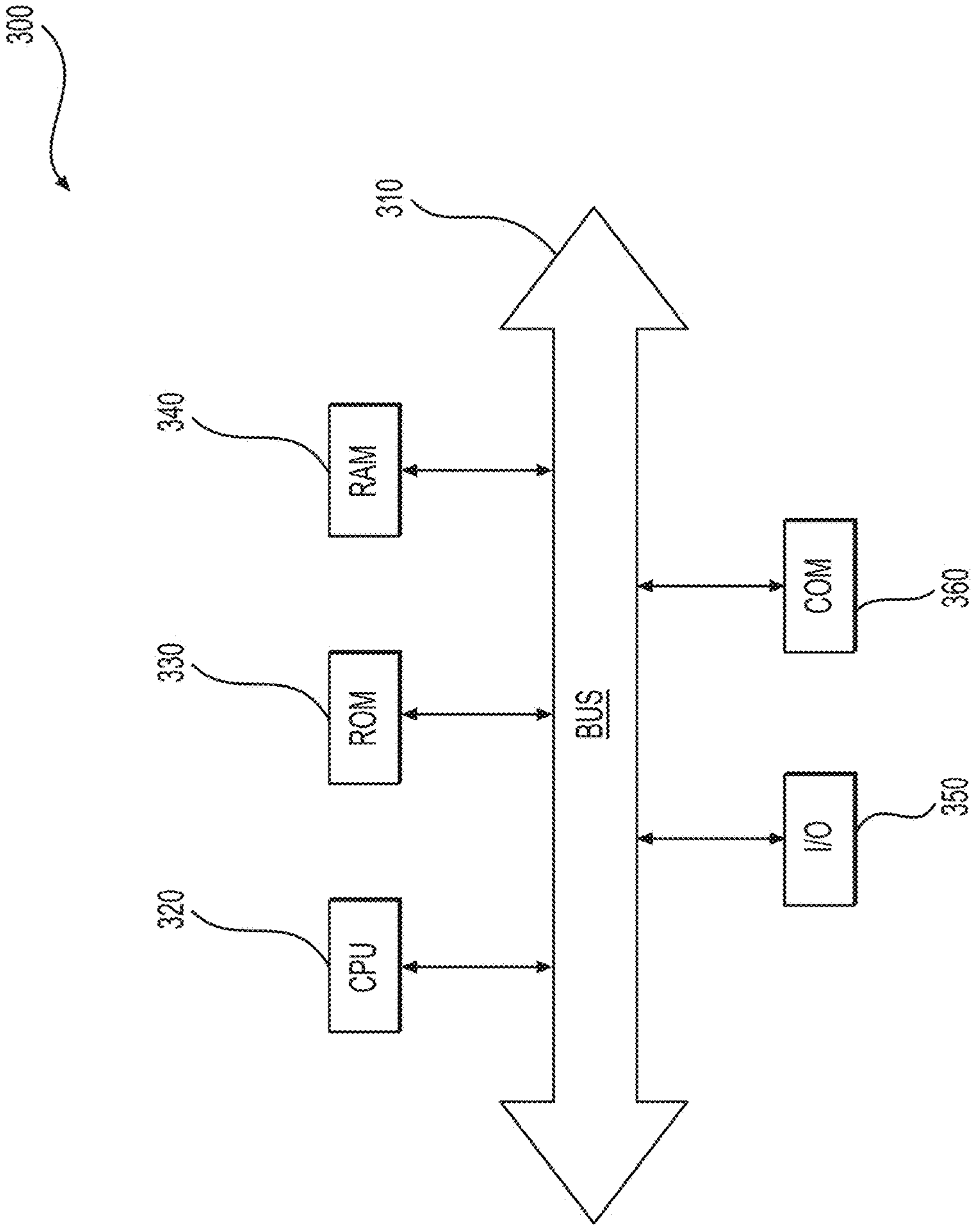
FIG. 3 is a simplified functional block diagram of a computer that may be configured as a device for executing the method of FIG. 2, according to exemplary embodiments of the present disclosure.

FIG. 3 is a simplified functional block diagram of a computer that may be configured as the user devices, servers, CDN, platforms, and/or exchanges for executing the methods, according to exemplary an embodiment of the present disclosure. Specifically, in one embodiment, any of the user devices, servers, CDN, platforms, and/or exchanges may be an assembly of hardware 300 including, for example, a data communication interface 360 for packet data communication. The platform may also include a central processing unit ("CPU") 320, in the form of one or more processors, for executing program instructions. The platform typically includes an internal communication bus 310, program storage, and data storage for various data files to be processed and/or communicated by the platform such as ROM 330 and RAM 340, although the system 300 often receives programming and data via network communications. The system 300 also may include input and output ports 350 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A computer-implemented method for online network traffic filtration, the method comprising:
- receiving, at a content provider, from a user device, a request for a web page, the request comprising one or more tags associated with the web page;
- generating a content request based on the one or more tags and the web page;
- determining a recipient of the content request based on the one or more tags and the web page;
- transmitting the content request to the determined recipient;
- transmitting, to the device of the user, an electronic content received from the recipient;
- tracking interactions by the user with the electronic content;
- determining a charge to the recipient is to be blocked based on the tracked interactions by the user with the electronic content; and
- blocking the charge to the recipient.

2. The computer-implemented method according to claim 1, further comprising:
- determining, prior to responding to the web page request, whether the device of the user includes an electronic content blocker based on the web page request from the user.

3. The computer-implemented method according to claim 1, wherein the content provider is at least one of an Internet publisher and a content distribution network.

4. The computer-implemented method according to claim 1, wherein the electronic content request recipient is at least one of a graphical electronic content exchange and a graphical electronic content server.

5. The computer-implemented method according to claim 1, wherein determining whether the web page request is valid includes:
- comparing an IP address of the web page request to a list of known fraudulent IP addresses.

6. The computer-implemented method according to claim 1, further comprising:
- accessing a database of user data;
- determining user data from the database to append to the electronic content request based on the web page from the device of the user; and
- appending user data from the database to the electronic content request.

7. The computer-implemented method according to claim 1, further comprising:
receiving, over the electronic network, an electronic content request response from the determined electronic content request recipient,
wherein the response to the electronic content request includes the electronic content request response.

8. A system for online network traffic filtration, the system including:
a data storage device that stores instructions for online network traffic filtration; and
a processor configured to execute the instructions to perform a method including:
receiving, at a content provider, from a user device, a request for a web page, the request comprising one or more tags associated with the web page;
generating a content request based on the one or more tags and the web page;
determining a recipient of the content request based on the one or more tags and the web page;
transmitting the content request to the determined recipient;
transmitting, to the device of the user, an electronic content received from the recipient;
tracking interactions by the user with the electronic content;
determining a charge to the recipient is to be blocked based on the tracked interactions by the user with the electronic content; and
blocking the charge to the recipient.

9. The system according to claim 8, wherein the processor is further configured to execute the instructions to perform the method including:
determining, prior to responding to the web page request, whether the device of the user includes an electronic content blocker based on the web page request from the user.

10. The system according to claim 8, wherein the content provider is at least one of an Internet publisher and a content distribution network.

11. The system according to claim 8, wherein the electronic content request recipient is at least one of a graphical electronic content exchange and a graphical electronic content server.

12. The system according to claim 8, wherein determining whether the web page request is valid includes:
comparing an IP address of the web page request to a list of known fraudulent IP addresses.

13. The system according to claim 8, wherein the processor is further configured to execute the instructions to perform the method including:
accessing a database of user data;
determining user data from the database to append to the electronic content request based on the web page request from the device of the user; and
appending user data from the database to the electronic content request.

14. The system according to claim 8, wherein the processor is further configured to execute the instructions to perform the method including:
receiving, over the electronic network, an electronic content request response from the determined electronic content request recipient,
wherein the response to the electronic content request includes the electronic content request response.

15. A non-transitory computer-readable medium storing instructions that, when executed by a computer, cause the computer to perform a method for online network traffic filtration, the method including:
receiving, at a content provider, from a user device, a request for a web page, the request comprising one or more tags associated with the web page;
generating a content request based on the one or more tags and the web page;
determining a recipient of the content request based on the one or more tags and the web page;
transmitting the content request to the determined recipient;
transmitting, to the device of the user, an electronic content received from the recipient;
tracking interactions by the user with the electronic content;
determining a charge to the recipient is to be blocked based on the tracked interactions by the user with the electronic content; and
blocking the charge to the recipient.

16. The computer-readable medium according to claim 15, further comprising:
determining, prior to responding to the web page request, whether the device of the user includes an electronic content blocker based on the web page request from the user.

17. The computer-readable medium according to claim 15, wherein the content provider is at least one of an Internet publisher and a content distribution network.

18. The computer-readable medium according to claim 15, wherein the electronic content request recipient is at least one of a graphical electronic content exchange and a graphical electronic content server.

19. The computer-readable medium according to claim 15, further comprising:
accessing a database of user data;
determining user data from the database to append to the electronic content request based on the web page request from the device of the user; and
appending user data from the database to the electronic content request.

20. The computer-readable medium according to claim 15, further comprising:
receiving, over the electronic network, an electronic content request response from the determined electronic content request recipient,
wherein the response to the electronic content request includes the electronic content request response.

* * * * *